Figure 1:
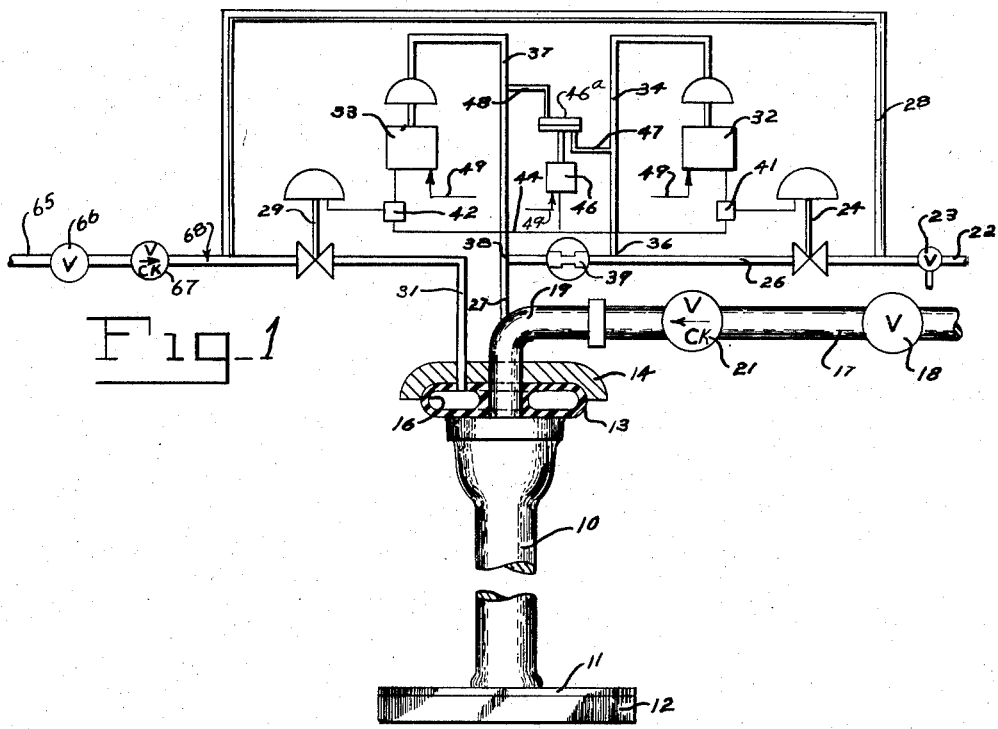

July 21, 1959  A. H. PAYNE, JR., ET AL  2,895,328
PROCESS AND APPARATUS FOR PRESSURE TESTING VESSELS
Filed Dec. 16, 1954

INVENTOR
ANDREW H. PAYNE JR.
HERMAN J. GAUGGEL JR.

BY Jennings & Carter

ATTORNEYS

2,895,328
PROCESS AND APPARATUS FOR PRESSURE TESTING VESSELS

Andrew H. Payne, Jr., and Herman J. Gauggel, Jr., Birmingham, Ala.

Application December 16, 1954, Serial No. 475,782

5 Claims. (Cl. 73—49.1)

Our invention relates to a process and apparatus for pressure testing vessels, and while not limited thereto relates to a method and apparatus of the character designated especially adapted to pressure test cast iron pipe and the like.

Heretofore in the testing of cast iron pipe and the like, it has been customary to bring the open ended pipe lengths endwise between stationary and movable sealing gaskets. Such gaskets ordinarily have been made of material such as blocks of oak or similarly tough, hard, wood. Insofar as we are aware the pressure with which the seal or seals have been pressed against the ends of the pipe heretofore has been based upon pipe diameter, if preset, or adjusted manually and roughly approximated by the press operator. With a preset pressure adjustment the settinng must be an average force for a partially worn gasket. This force is too great for a new gasket causing accelerated wear and too light for a worn gasket causing excessive leakage and early replacement. With a manual adjustment no control can be exercised and the gasket wear is very rapid resulting in frequent gasket replacements. In summary, prior testing apparatus and processes of this kind lack accuracy and the equipment is expensive to maintain.

In view of the foregoing a prime object of our invention is to provide a process of pressure testing vessels in which the movable closure for the end of the vessel is forced thereagainst by a force which bears a relationship between the test pressure within the vessel and the physical condition of the gasket at the time of test, whereby excessive pressure on the closure is eliminated while at the same time adequately sealing the vessel.

Another object is to provide a process of the character designated in which the test pressure is applied substantially simultaneously to the inside of the vessel and to a means for bringing the closure into sealing relation with the end of the vessel, and in then sensing the pressure drop, if any, between different points in the pressure test line, and in using the indication of a pressure drop so obtained both to limit the total force with which the movable closure is pressed against the vessel and to stop the flow of test fluid into the vessel.

Another object is to provide a process for pressure testing vessels in which fluid under pressure is utilized to hold the closure against the end of the vessel and in which fluid under the same pressure and preferably from the same source is utilized in the vessel as the test fluid, together with the step of correlating the effects produced on the closure and on the vessel by said pressure, to the end that the closure is forced against the vessel end with enough force but no more than is necessary to seal the same.

Another object is to provide pressure testing apparatus especially effective to carry out the foregoing process and which embodies a closure for the end of the vessel movable to close position by fluid under pressure together with means to admit fluid under pressure thereto and to the inside of the vessel, there being regulating valves for said pressures, and means holding within predetermined limits the pressure applied both to the closure and within the vessel in response to a drop in pressure in the line supplying the fluid under pressure to the vessel, whereby the closure is held against the end of the vessel with force sufficient, but only sufficient, to seal the vessel for the particular test pressure.

Another object of our invention is to provide apparatus embodying the foregoing features in which the presence of unusually large leaks past the sealing gasket or from the vessel are detected by means effective to prevent an increase in clamping pressure on the sealing gasket and effective to shut off the inside of the vessel from the source of test fluid, whereby damage to the apparatus is prevented, excessive use of high pressure water is eliminated and the indication of worn or damaged sealing gaskets is obtained if the leak is at that point.

Further and more general objects of our invention are to provide apparatus for pressure testing vessels which may efficiently and effectively be employed by unskilled labor; to provide such apparatus which shall be economical of manufacture and installation and which may readily be associated with existing ram type test apparatus; and which shall be positive and dependable in operation, affording means whereby a cast iron pipe manufacturer can be sure that pipe put through the apparatus has been effectively and automatically tested without further manual interference by the operator.

Figure 2:
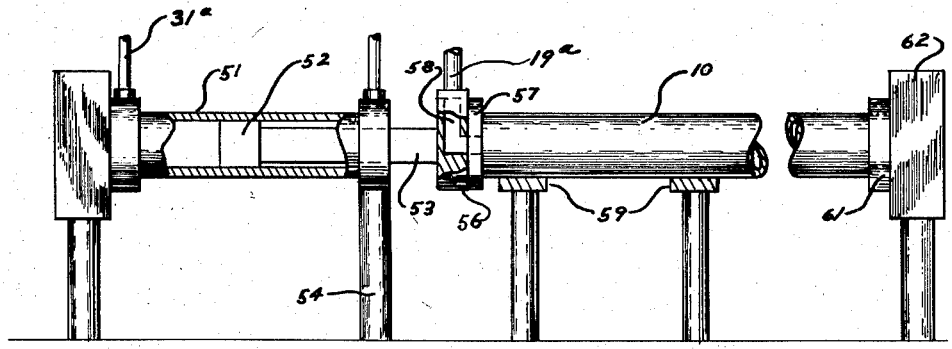

Apparatus illustrating features of our invention and which is suitable for carrying out our improved process is shown in the accompanying drawings forming a part of this application in which:

Fig. 1 is a wholly diagrammatic view of our improved apparatus, certain of the parts being broken away and in section; and Fig. 2 is a wholly diagrammatic view with certain parts broken away and in section and showing how our improved mechanism may be associated with a ram type testing apparatus.

Referring now to the drawing for a better understanding of our invention, we show in Fig. 1 a length of bell and spigot cast iron pipe indicated at 10 and which it is desired to pressure test. To carry out our procedure we may rest one end of the pipe against a sealing gasket 11 associated in any suitable manner with a support indicated diagrammatically at 12. The other end of the pipe may be closed by an expansible or inflatatable member of rubber, plastic material or the like indicated at 13. The expansible closure may be supported in any suitable manner as indicated diagrammatically by the housing 14. As will appear, with the length of pipe in place and with the test procedure in effect, the closure 13 has fluid admitted to the recess 16 through pipe 31 which may be flexible therein whereby the same expands against the end of the pipe, sealing it. It will oftentimes be necessary to prefill the sealing gasket with liquid before applying the high sealing pressure liquid. At 65 we show a pipe under the control of valve 66 which leads to a source of water, not necessarily under high pressure but under sufficient pressure to substantially fill the recess 16 of the closure 13 through the flexible pipe 31. Also included in the line 65, between the valve 66 and the pipe 68, is a check valve 67 which permits water to flow only in the direction indicated.

While the vessels in question may be tested with various fluids, for the purpose of illustrating our invention we will show and describe the same as being tested with a suitable liquid such as water. At 17 we show a relatively large diameter pipe under control of a valve 18 and which leads to a source of water, not necessarily under high pressure but under sufficient pressure substantially to fill the pipe 10 when the valve is opened.

Pipe 17 may terminate in a flexible section 19 which is secured in suitable manner to the holder 14 and about which the periphery of the closure 13 is free to move. At the same time, water may be admitted to the pipe 10 through the holder 14 and the closure 13. In other words, the end of the flexible pipe 19 may be sealed in any suitable manner within the closure 13 which will permit entrapped gases to escape and without preventing the expansion of the closure into pipe sealing position. Also included in the line 17, between the valve 18 and the pipe 10 is a check valve 21 which permits water to flow only in the direction indicated.

Water under relatively high pressure, for instance 500 pounds per square inch gauge, representing the pressure at which the pipe is to be tested may be supplied from any suitable source, not shown, through a line 22. The line 22 may be under control of a manual three way valve 23. At 24 we show diagrammatically a diaphragm regulating valve which controls the flow of water through its associated line 26 and thence through a line 27 into the vessel through the flexible line 19. The high pressure water is supplied through a line 28 to a second diaphragm regulating valve similar to valve 24 and indicated diagrammatically at 29. Water under pressure as controlled by the valve 29 is supplied from the pipe 28 through a pipe 31 to the inside of the expansible closure member 13.

It will be seen that when valve 23 is opened water under relatively high pressure is supplied substantially simultaneously to the inside of the pipe 10 and to the recess 16 in the closure member.

The pressure admitted to the line 26 from the diaphragm regulating valve 24 is limited to a maximum as determined by a preset pressure pilot 32. In like manner, the amount of pressure admitted through line 31 by valve 29 is limited by a preset pressure pilot 33. The preset pressure pilot 32 has its diaphragm connected by a line 34 to the line 26 at the point 36. The preset pressure pilot 33 has its diaphragm connected to the line 26 through a line 37 at the point 38. Between the points 36 and 38 is any suitable form of metering orifice indicated at 39.

The pressure pilot 32 operates the preset diaphragm regulating valve 24 through an intermediate three way lock-up valve 41. Similarly the pressure pilot 33 operates its associated valve 29 through an intermediate three way lock-up valve 42. The valves 41 and 42 in turn are connected by a line 44 to the output of a differential pressure pilot designated generally by the number 46. The diaphragm 46a of the differential pressure pilot is connected by lines 47 and 48 to the lines 34 and 37, respectively. Each of the pressure pilots 32 and 33 and the differential pressure pilot 46 may be connected by line 49 to a controlled pressure from an instrument air supply, not shown.

From the foregoing the process and apparatus so far described may now be readily explained and understood. With the system normally at rest it will be seen that the resilient closure 13 is collapsed due to its inherent return characteristics when the three-way valve 23 is turned to drain position. The pipe 10 then is placed with one end on the gasket 11 and the other underneath the closure 13. Valve 18 is opened, substantially filling the pipe 10 with water. The entrapped gases in the pipe 10 can escape through suitable means associated with the closure 13, not shown. The next step is to open valve 23 whereupon water under the high pressure from line 22 is supplied substantially simultaneously through the respective valves 24 and 29 to the inside of pipe 10 and to the expansible closure 13. The closure then moves into sealing position and the pipe 10 is completely filled with water from the high pressure line 22. Due to the check valves 21 and 67, reverse flow into the relatively low pressure in lines 17 and 65 is prevented.

In the event the pipe does not leak or burst and in the event there is no leak around the closure 13, as soon as the pipe 10 is completely filled there is no further flow through the metering orifice 39. In this case the valves 24 and 29 admit fluid to their respective parts under a pressure as predetermined by their pressure pilots 32 and 33, respectively. However, should there be any flow between the points 36 and 38 in line 26 the differential pressure pilot 46 senses this flow. After this flow has exceeded a preset quantity it will cause the differential pressure pilot 46 to send a signal through line 44, simultaneously, to the intermediate three-way lock-up valves 41 and 42. These valves are so set that the receipt of such signal through the line 44 has the effect immediately of closing valve 24 and preventing valve 29 from increasing the pressure in line 31. Thus, if the pipe bursts or develops excessive leaks, immediately no further pressure is placed on the closure 13, preventing damage to it. Simultaneously, the flow of high pressure fluid through line 26 is stopped, preventing injury to the workmen or loss of water. In the event there is a leak around the gasket 13 which permits the escape of an unusually large amount of water, it will be apparent that the action just explained takes place, thus indicating to the operator that the gasket is leaking or not properly sealing. It will be understood that various kinds of gauges, signals and the like may be incorporated in the system and in view of the fact that these are well known to the art they are not illustrated.

Assuming that the pipe has successfully withstood the test, valve 23 is turned to drain position thus relieving the pressure in the closure 13 and in the pipe 10. With valve 18 closed the pipe may be removed from between the gaskets in the manner well understood. It will be seen that regardless of the pressure in the line 22, this same pressure is transmitted to the inside of the pipe and to the movable closure in precisely a predetermined or proportioned amount. Thus, during the test period, the pressure with which the gasket or closure 13 is forced against the pipe is directly proportional to the pressure inside the pipe. The total force on the closure may thus accurately be said to be proportional to the unit pressure (pounds per square inch, etc.) inside the pipe 10, during the test. Through the medium of the preset pressure pilot 33 the clamping pressure of the closure 13 will automatically adjust itself so as to be just adequate to seal the pipe when under the desired testing pressure supplied automatically by the present pressure pilot 32 but not of such an amount as to damage the closure.

In Fig. 2 we show in diagrammatic manner a slightly modified form of our invention. In view of the fact that the control valves are identical we have illustrated only certain of the conduits that lead to the apparatus proper.

In Fig. 2 we show a fluid pressure cylinder 51 which has a piston 52 and a piston rod 53. The cylinder is supported in any suitable manner on framework 54. On the end of the piston rod 53 is a head 56 which carries a sealing gasket of wood, rubber or the like indicated at 57. The head may be provided with a passage 58 to admit fluid from the pipe 19a, corresponding to pipe 19, to the inside of the pipe 10. The pipe to be tested may be supported in position on suitable supports 59 and the opposite end may rest against a suitable gasket 61 held in any suitable manner by a member 62.

The pipe 31a corresponds identically to the line 31 so that fluid under pressure forcing gasket 57 against the end of pipe 10 is proportional and in a fixed relationship relative to the test pressure flowing through the line 19a into the pipe 10. The form of mechanism illustrated in Fig. 2 is shown for the purpose of indicating the way in which our invention may be associated with existing ram type testing apparatus embodying a fluid pressure cylinder.

The operation of the modification just described is identical with the one already described as will be apparent from the drawing.

From the foregoing it will be apparent that we have devised an improved process and apparatus for testing vessels under pressure. The importance of holding the closure against the end of the vessel with a force which is proportional to the pressure inside the vessel will be readily appreciated. Likewise, the concept of sensing the flow of fluid in the line leading to the inside of the vessel for the purpose of limiting the sealing force on the closure and to shut off the flow of high pressure fluid into the vessel under test also will be appreciated. By these means we not only indicate whether the vessel actually is being tested under pressure but, as stated, utilize this to protect the apparatus.

In this specification and in the appended claims we refer to vessels having an "open end." This expression is intended to include vessels of any configuration having an opening thereinto through which fluid can be introduced and which can be sealed temporarily for effecting the test.

While we have shown our invention in but two forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. The process of pressure testing a vessel having at least one open end which comprises substantially filling the vessel with fluid, bringing a closure member into sealing position with the open end of the vessel, completely filling the vessel with fluid from a line under test pressure, continuously sensing the unit pressure inside the vessel during the test holding the closure in sealing position during the test with a force which is a function of said sensed pressure inside the vessel, and utilizing the escape of fluid from the vessel or around the closure to limit the total force exerted on said closure and to shut off said test pressure.

2. In apparatus for pressure testing vessels having at least one open end, a pressure actuated closure for sealing the open end of the vessel, means to fill the vessel with fluid, means to put the fluid in the vessel under test pressure, means continuously to exert on the closure during the test a pressure of a predetermined ratio to the pressure in the vessel for urging the closure into sealing relation with the vessel, and controls effective upon escape of a predetermined amount of fluid from the vessel or around the closure to limit the pressure of said closure on the open end of the vessel and to shut off said test pressure.

3. In apparatus for pressure testing vessels having at least one open end, a pressure actuated closure disposed when under predetermined pressure to seal the open end of the vessel, a source of fluid under pressure sufficient to effect said test, conduits leading to the pressure actuated closure and to the vessel, a pressure regulating valve controlling the admission of said test pressure fluid to the said pressure actuated closure from its associated conduit, a second pressure regulating valve controlling the admission of said test pressure fluid to the vessel from its associated conduit, pre-set controls for said pressure regulating valves limiting the pressure of fluid admitted by said pressure regulating valves to the closure and to the vessel, and other controls effective to sense a flow of fluid in the test pressure conduit leading to the vessel and effective upon a pre-determined flow therein to limit pressure admitted to the closure and to close the pressure regulating valve controlling the supply of fluid to the vessel.

4. In apparatus for pressure testing vessels having at least one open end, an expansible closure member for sealing the open end of the vessel, a recess in said closure member for receiving fluid, means to fill the vessel with fluid, fluid pressure means communicating with said recess in the closure member and with said vessel and placing the fluid in the vessel under test pressure whereby the closure member is urged constantly during the test into sealing relation with the vessel with a pressure of a predetermined ratio to the test pressure, and controls effective upon escape of a predetermined amount of fluid from the vessel or around the closure to limit the pressure of said closure on the open end of the vessel and to shut off said test pressure.

5. In apparatus for pressure testing vessels having at least one open end, a pressure actuated closure disposed when under predetermined pressure to seal the open end of the vessel, conduits leading to the pressure actuated closure and the vessel for conveying thereto fluid under test pressure, a pressure regulating valve controlling the admission of said test pressure fluid to the vessel from its associated conduit, and controls effective to sense a flow of fluid in the test pressure conduit leading to the vessel and effective upon a predetermined flow therein to limit pressure admitted to the closure and to close the pressure regulating valve controlling the admission of fluid to the vessel.

References Cited in the file of this patent

UNITED STATES PATENTS

| | | |
|---|---|---|
| 2,329,035 | Cross | Sept. 7, 1943 |
| 2,481,013 | Henderson | Sept. 6, 1949 |
| 2,522,927 | Camerota | Sept. 19, 1950 |
| 2,573,053 | Pearlman | Oct. 30, 1951 |
| 2,618,963 | Wagenhals | Nov. 25, 1952 |
| 2,683,982 | Lassman et al. | July 20, 1954 |
| 2,705,888 | Sedgwick | Apr. 12, 1955 |
| 2,707,388 | Kent | May 3, 1955 |